(12) United States Patent
Artelsmair et al.

(10) Patent No.: US 8,179,085 B2
(45) Date of Patent: May 15, 2012

(54) METHOD AND APPARATUS FOR CHARGING AN ENERGY STORE

(75) Inventors: Bernhard Artelsmair, Pettenbach (AT); Reinhold Fink, Waldhofen/Ybbs (AT); Gerhard Horner, Linz (AT)

(73) Assignee: Fronius International GmbH, Pettenbach (AT)

( * ) Notice: Subject to any disclaimer, the term of this patent is extended or adjusted under 35 U.S.C. 154(b) by 365 days.

(21) Appl. No.: 12/451,820

(22) PCT Filed: May 26, 2008

(86) PCT No.: PCT/AT2008/000180
§ 371 (c)(1),
(2), (4) Date: Dec. 2, 2009

(87) PCT Pub. No.: WO2009/003202
PCT Pub. Date: Jan. 8, 2009

(65) Prior Publication Data
US 2010/0156340 A1    Jun. 24, 2010

(30) Foreign Application Priority Data
Jun. 29, 2007  (AT) .................................. 1010/2007

(51) Int. Cl.
  *H01M 10/44* (2006.01)
  *H01M 10/46* (2006.01)
(52) U.S. Cl. ........................ 320/104; 320/150
(58) Field of Classification Search .................. 320/101, 320/104, 114, 115, 150, 153; 429/400, 434, 429/436, 61, 62
See application file for complete search history.

(56) References Cited

U.S. PATENT DOCUMENTS

| 4,199,713 | A |   | 4/1980 | Förster |
| 5,602,459 | A | * | 2/1997 | Rogers ........................ 320/138 |
| 5,610,499 | A | * | 3/1997 | Rogers ........................ 322/25 |
| 5,720,608 | A |   | 2/1998 | Aoki et al. |
| 6,792,259 | B1 | * | 9/2004 | Parise ........................ 320/109 |

(Continued)

FOREIGN PATENT DOCUMENTS

DE    44 09 685    10/1994
(Continued)

OTHER PUBLICATIONS

International Search Report. Chinese Examination Report dated Sep. 27, 2011 in Chinese Patent Application No. 200880022695.6 along with an English translation of same.

*Primary Examiner* — Edward Tso
(74) *Attorney, Agent, or Firm* — Collard & Roe, P.C.

(57) ABSTRACT

The invention relates to a method and an apparatus (1) for charging an energy storage (2) via a current generating device (3), comprising at least one control device (6), a burner (7) connected to a tank (11) for fuel supply, a charging device (4) connected to the energy storage (2), and a thermal element (8) whose one side is connected to the current generating device (3). To create such a method and such an apparatus (1), by means of which the capacity of an energy storage (2) of a vehicle (5) can be maintained for a longer period of time, it is provided for the second side of the thermal element (8) to be connected to a heat dissipating element (9) of a vehicle (5), and a monitoring unit (19) for the temperature of the heat dissipating element (9) is provided and connected to the control device (6) so that the current generating device (3) will be controllable to charge the energy storage (2) as a function of the temperature of the heat dissipating element (9).

20 Claims, 3 Drawing Sheets

U.S. PATENT DOCUMENTS

| | | |
|---|---|---|
| 7,180,264 B2 | 2/2007 | Smith et al. |
| 2002/0114984 A1* | 8/2002 | Edlund et al. .................. 429/19 |
| 2006/0016446 A1 | 1/2006 | Hu et al. |
| 2006/0028165 A1 | 2/2006 | Smith et al. |
| 2007/0126236 A1 | 6/2007 | Tamura et al. |

FOREIGN PATENT DOCUMENTS

| | | |
|---|---|---|
| DE | 43 13 827 | 11/1994 |
| JP | 2005-268240 | 9/2005 |
| JP | 2006-006025 | 1/2006 |

* cited by examiner

METHOD AND APPARATUS FOR CHARGING AN ENERGY STORE

CROSS REFERENCE TO RELATED APPLICATIONS

This application is the National Stage of PCT/AT2008/000180 filed on May 26, 2008, which claims priority under 35 U.S.C. §119 of Austrian Application No. A 1010/2007 filed on Jun. 29, 2007. The international application under PCT article 21(2) was not published in English.

The invention relates to a method for charging an energy storage via a current generating device and a charging device, wherein a burner of the current generating device is supplied with fuel from a tank, and wherein the burner is heated in its activated state by combustion of the fuel, said combustion being controlled by a control device, and wherein the current is generated with a thermal element by a temperature difference and used for charging the energy storage, one side of said thermal element being connected to the current generating device.

The invention likewise relates to an apparatus for charging an energy storage via a current generating device, comprising at least one control device, a burner connected to a tank for fuel supply, a charging device connected to the energy storage, and a thermal element whose one side is connected to the current generating device.

Charging devices for charging batteries are known from the prior art which are primarily supplied from the public power grid and partly by means of sun energy. This allows for charging devices, which in most cases include a control unit comprised of a microcontroller, to supply the current for the corresponding charging processes for an energy storage, e.g. a battery. This in particular prolongs service life of the battery.

Use of solar energy for energy supply is made in particular when no public supply grid is available. Yet, this requires daylight and enough space with collectors. Consequently, charging devices with such a power supply are of a correspondingly large size which is why a portable design thereof is often not possible.

U.S. Pat. No. 7,180,264 B2 solves this problem for portable charging devices in that the charging current for the batteries is generated by means of a device which consists of a tank with fuel, a burner, a thermal element, and a control device. Due to its physical properties, the thermal element generates an electric voltage and/or an electric energy if the thermal element is connected to a consumer and electric current is thus flowing. A prerequisite for the occurrence of said thermoelectric voltage is that there is a certain temperature difference between one side and that side of the thermal element opposing the latter. To this end, one side of the thermal element is heated by means of a burner which combusts the fuel from the tank, whereas the other side of the thermal element is of ambient temperature so as to ensure the temperature difference necessary for said thermoelectric voltage. This method allows in particular for lithium ion and lithium polymer batteries to be charged at a maximum capacity of 0.5 Ampere hours (Ah)

What is disadvantageous here is the relatively low degree of efficiency of such thermal elements. This is to be attributed to the fact that the heat emitted from the burner to the thermal element will also be delivered to the opposing side of the thermal element, and can there not, or insufficiently, be dissipated. The fact that the temperature of the ambiance quickly adapts to the temperature at the opposing side of the thermal element, which is heated by the burner, results in that the temperature difference necessary for current generation is no longer given, thus delimiting the time required for charging the battery. This is why energy storages and batteries of higher capacities which consequently need a longer period of time for charging cannot be charged effectively. Charging would have to be interrupted already after a short period of time until the temperature difference necessary would have been restored. Accordingly, a battery and an energy storage of a higher capacity, e.g. 30 Ah or higher, as is the case with an energy storage of a vehicle, in particular of a motor vehicle, cannot be charged in a gentle and effective manner.

The object of the present invention is to create an above mentioned method, and an above mentioned apparatus by means of which a higher degree of efficiency and a longer charging time can be achieved, and the capacity and functionality of an energy storage of a vehicle can be maintained for a longer period of time.

In terms of method, the object of the invention is achieved in that the energy storage is charged for maintaining the capacity of the energy storage of a turned off, non used vehicle, in particular of a motor vehicle, wherein the temperature of a heat dissipating element is monitored, which heat dissipating element is connected to the second side of the thermal element, and to which the current generating device is mounted, and wherein the burner is controlled as a function of the temperature of the heat dissipating element measured. What is advantageous here is that a self-discharge of the energy storage or the battery of the turned off vehicle is compensated for, and/or that there is a maintenance charging of the battery. This ensures that the vehicle can still be started even after longer periods of non-use, e.g. several weeks. This likewise enables the necessary charge of the battery to be permanently maintained to allow for in particular continuous consumers, e.g. an alarm system, a radio central locking system, etc., to be supplied with sufficient electric energy. Thanks to the heat dissipating element the temperature difference of the thermal element necessary for voltage generation can be maintained, provided that the temperature of the burner connected to one end of the thermal element is constant, and a constant charging of the energy storage can thus be achieved. The engine block or frame parts is (are) particularly suited to serve as a heat dissipating element in vehicles, in particular in motor vehicles. In particular in the case of a heat dissipating element comprised of the engine block of the vehicle, the temperature of the heat dissipating element will be increased after the vehicle has been put into operation, and decreased after the vehicle has been turned off, thus advantageously allowing for an automatic detection of whether the vehicle has been put into operation or turned off. After the engine of the vehicle has been turned off, the temperature difference of the thermal element necessary for the charging process will be achieved by appropriate cooling of the engine block or the heat dissipating element.

The burner will then be activated in an advantageous manner in case the measured temperature of the heat dissipating element has fallen short of a certain threshold value.

If the condition of the energy storage, in particular the voltage of the energy storage, is monitored, the energy storage can be charged as a function of its charging condition.

Moreover, there is the possibility of selecting an appropriate charging process for the energy storage as a function of the charging condition. This allows for a charging process (maintenance charging, fast charging, etc.), which corresponds to the charging condition, to be selected from predefined and correspondingly stored processes. This enables gentle charging and maintenance of the capacity of the energy storage.

In case the charge of the energy storage and/or its voltage has fallen below a threshold value, the burner will be activated, and the energy storage charged, in an advantageous manner. This allows for the duty cycle to be shortened, and for the service life of the components, e.g. the thermal element, to be prolonged.

Upon activation of the burner, the same will advantageously be supplied with fuel from the tank of the combustion engine equipped vehicle and ignited, with the fuel being combusted. Thus, the burner is supplied with the same fuel as the engine of the vehicle.

It is likewise of advantage that the temperature of the burner is adapted to the thermal element, thus allowing for the temperature to be flexibly adaptable to the type and the properties of the thermal element. This also prolongs service life of the thermal element, and the optimum degree of efficiency of the thermal element is obtained.

To achieve a constant heating of the thermal element, and thus a constant temperature difference at the thermal element, the burner is preferably kept at a substantially constant temperature during combustion. This can be realized by means of an appropriate temperature control method using temperature sensors.

In an advantageous manner, the temperature of the burner is monitored so as to allow for appropriate steps to be taken in case of a deviating temperature, e.g. to allow for a change in the fuel supply, in particular to keep the temperature of the burner constant.

Due to the measure of deactivating the burner in case a threshold value of the temperature of the burner or the thermal element on that side connected to the burner has been exceeded it can be avoided that the maximum temperature of the thermal element is exceeded, what otherwise could result in a destroyed thermal element.

The measure of deactivating the burner in case a threshold value of the charge and/or the voltage of the energy storage has been exceeded allows for an efficient charging of the energy storage to be achieved. It is likewise possible to deactivate the burner in case the voltage threshold value of the thermal element has been exceeded, with the increasing temperature thus enabling detection of that the engine of the vehicle has been started, and that the energy storage is consequently being charged by the usually present electric generator of the vehicle, with this detection being possible without any additional means, e.g. an appropriate electronic circuit.

Data exchange between the control unit and an electronic circuit of the vehicle allows for a communication between the charging apparatus and present electronic components of the vehicle to be established. For example, this allows for the fuel level of the tank to be queried. The electronic circuit of the vehicle can optionally also influence the control device of the charging device.

The object of the invention is also achieved by an above mentioned charging apparatus, wherein the second side of the thermal element is connected to a heat dissipating element of a vehicle, and wherein a monitoring unit for the temperature of the heat dissipating element is provided and connected to the control device so that the current generating device is controllable to charge the energy storage as a function of the temperature of the heat dissipating element. The advantages arising therefrom can be learned from the above description.

If at least one sensor is provided for detection of the temperature of the heat dissipating element, and connected to the monitoring device, the temperature of the heat dissipating element can be correspondingly monitored, and the burner can consequently be controlled in an appropriate manner.

Here, the at least one sensor is preferably integrated in a housing of the apparatus, with the housing being mounted to the heat dissipating element. In this manner, the at least one sensor does not have to be additionally attached to the heat dissipating element but can be attached to the heat dissipating element together with the housing of the apparatus. This also allows for the present charging apparatus to be easy to retrofit in a vehicle.

If at least one sensor is provided for detection of the temperature of the burner and connected to the monitoring unit, the thermal element can be operated in a manner to achieve an optimum degree of efficiency.

As already mentioned above, the heat dissipating element is preferably comprised of an engine block or a frame part of the vehicle. These vehicle elements act as cooling elements and ensure a constant temperature, and a constant temperature difference of the thermal element, for a longer period of time.

In an advantageous manner, a device for detecting the charging condition of the energy storage, in particular for detecting the voltage of the energy storage, is provided and connected to the monitoring unit. This allows for the burner to be activated selectively if the energy storage has to be charged.

In an advantageous manner, the monitoring unit is integrated in the control device of the charging apparatus.

To establish a communication between the control device of the charging apparatus and an electronic circuit of the vehicle, the control device can be connectable to the electronic control of the vehicle, in particular via a data bus.

The present invention and its advantages will be explained in more detail by way of the annexed schematic drawings which show an exemplary embodiment, and in which.

Initially, it is pointed out that the same parts of the exemplary embodiment are provided with the same reference numbers.

FIGS. 1 to 5 together show the functional set-up of the inventive apparatus 1 as well as the inventive method for charging the energy storage 2.

Figure 1:
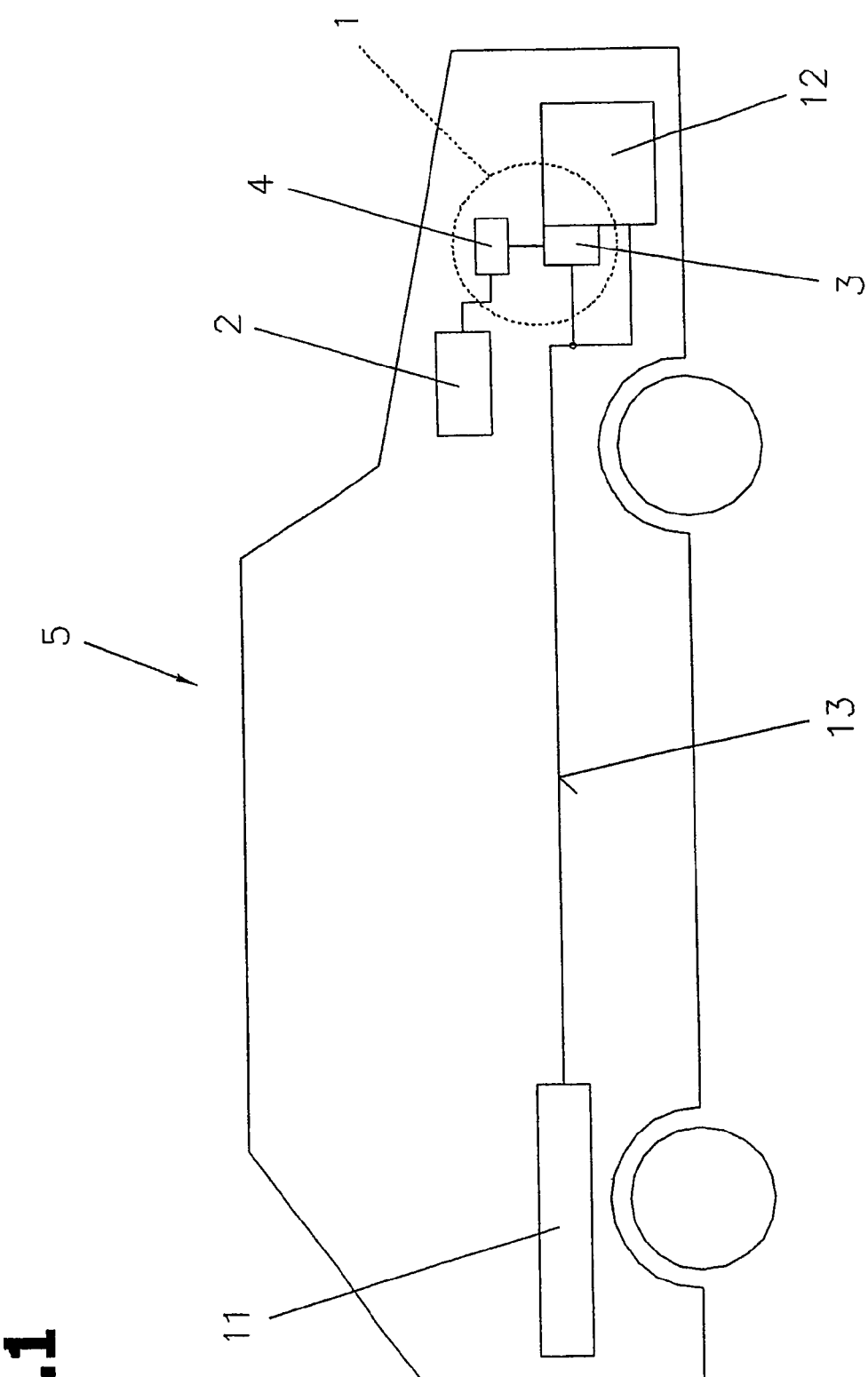
FIG. 1 shows the functional set-up of the inventive apparatus.

FIG. 1 illustrates the functional set-up of the apparatus 1 for charging an energy storage 2, wherein the apparatus 1 is comprised of a current generating device 3 and a charging device 4. The current generating device 3 and the charging device 4 are preferably arranged in a housing (not illustrated) which is mounted to an engine block 12 of a vehicle 5. This allows for the energy storage 2 of a turned off, non used vehicle 5 to be charged for maintaining the capacity of the energy storage 2. The original capacity of the energy storage 2 can be maintained for a long period of time since it is possible to counteract a self-discharge of the energy storage 2 as well as a consumption of the stored energy by consumers. The functionality of the energy storage 2 is likewise maintained, in particular due to a gentle charging, for example to not affect the properties of a starter battery of the vehicle 5 used as energy storage 2.

It goes without saying that the current generating device 3 and the charging device 4 can be designed as two separate structural units. This allows for the current generating device 3 to be substantially smaller, and for a simple mounting to the engine, in particular to the engine block 12, of the vehicle 5 since there is usually relatively little space in the engine compartment of a vehicle 5. In contrast, the charging device 4 can be mounted where enough space is left. What is essential here is that the current generating device 3 is mounted to a part of the vehicle 5 which dissipates heat well, whereas the charging device 4 does not require any heat dissipating parts.

Figure 2:
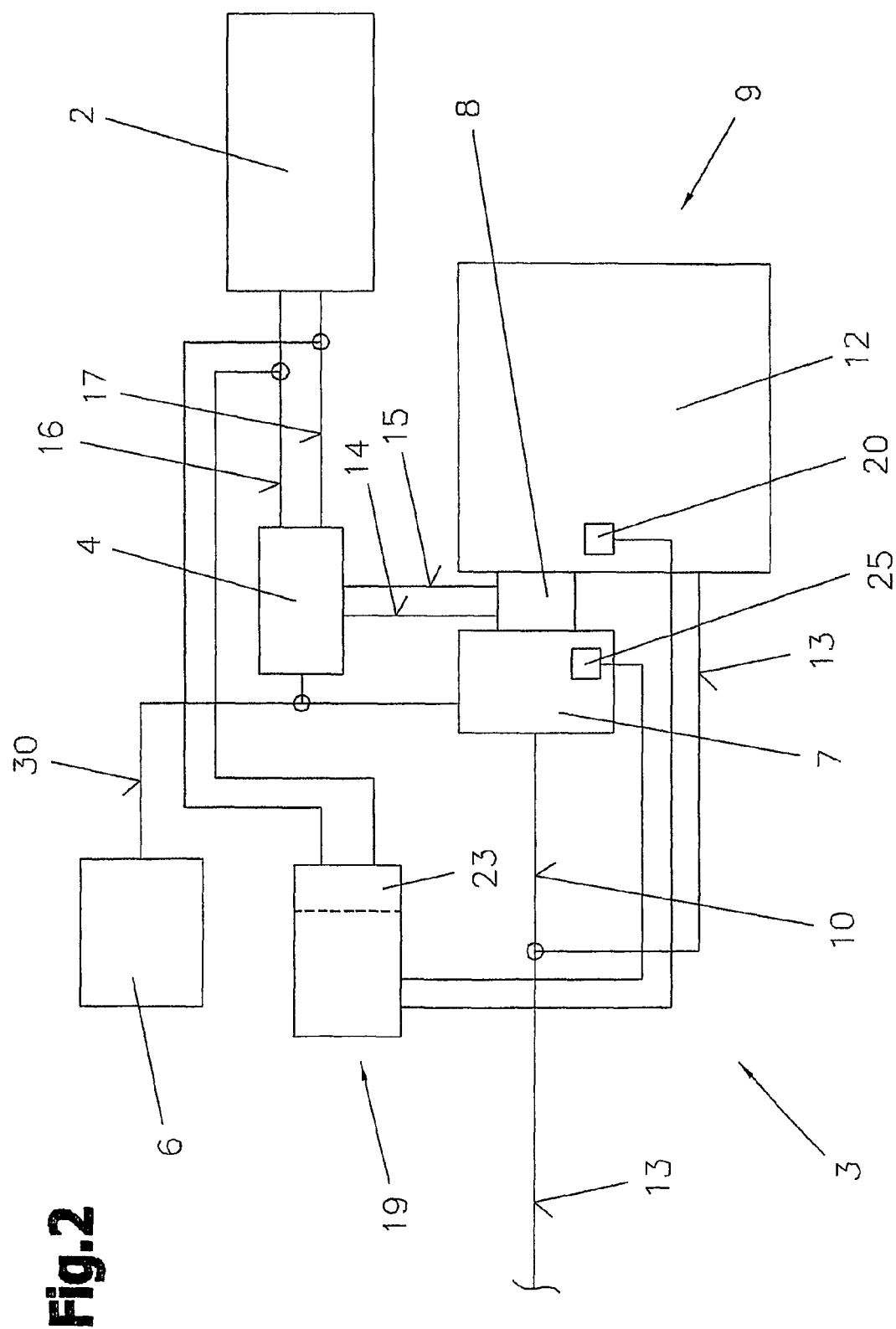
FIG. 2 shows a block diagram of the components of a charging apparatus.

In detail, as can be seen in FIG. 2, the current generating device 3 consists of a control device 6, a burner 7, a thermal element 8, a heat dissipating element 9, and a supply line 10 for fuel from a tank 11 of the vehicle 5. The control device 6 is preferably comprised of a microprocessor. The heat dissipating element 9 is preferably comprised of the engine and/or the engine block 12 of the vehicle 5, wherein a frame part or the like of the vehicle 5 may also be used. In the engine compartment of the vehicle 5, the fuel supply line 10 is connected to the supply line 13 of the fuel for the engine and/or the engine block 12, optionally via a fuel filter and a pump (not illustrated). The current generating device 3 can deliver the current required by the charging device 4 for charging the energy storage 2 to the charging device 4 via two lines 14, 15. To allow for the charging device 4 to charge the energy storage 2, the former is connected to the energy storage 2 via two charging lines 16, 17. Preferably, appropriate connections are provided at the apparatus 1 for a simple mounting to which the fuel supply line 10 as well as the charging lines 16, 17 can be connected. Furthermore, at least the charging device 6 and the burner 7 can be connected to the control device 4 via a data bus 30.

Essentially, the power or current for charging the energy storage 2 is generated by the thermal element 8 if the temperature difference 27 necessary between the two sides of the thermal element 8 is given. The two sides of the thermal element 8 are generally also referred to as the so-called "hot side" and "cold side". Accordingly, the "hot side" of the thermal element 8 is on the burner 7, and the "cold side" of the thermal element 8 is on the engine block 12. Since the thermal elements 8 have only a low degree of efficiency of from about 5 to 15 percent, dissipation of heat from the "cold side" is of particular importance. The heat (e.g. 50 Watt) generated by the burner 7 on the "hot side" of the thermal element 8 minus the degree of efficiency (e.g. 5 percent) must be dissipated from the "cold side" of the thermal element 8 (accordingly, 47.5 Watt). According to the invention, this function is fulfilled by the engine block 12 which absorbs the dissipated heat of the "cold side", thus acting as a cooling element. This ensures a permanently constant temperature difference 27 at the thermal element 8 since the engine block 12 keeps the "cold side" substantially at ambient temperature or air temperature. To allow for this constant temperature difference 27 to be maintained, it is also necessary to keep constant the temperature of the burner 7. In this respect, it is of particular importance to appropriately control the air fuel mixture, as necessary for a vaporizing burner 7, e.g. According to the invention, this function is fulfilled by the control device 6 during operation of the burner 7, wherein the latter is correspondingly connected to the control device 6 via the data bus 30.

Figure 3:
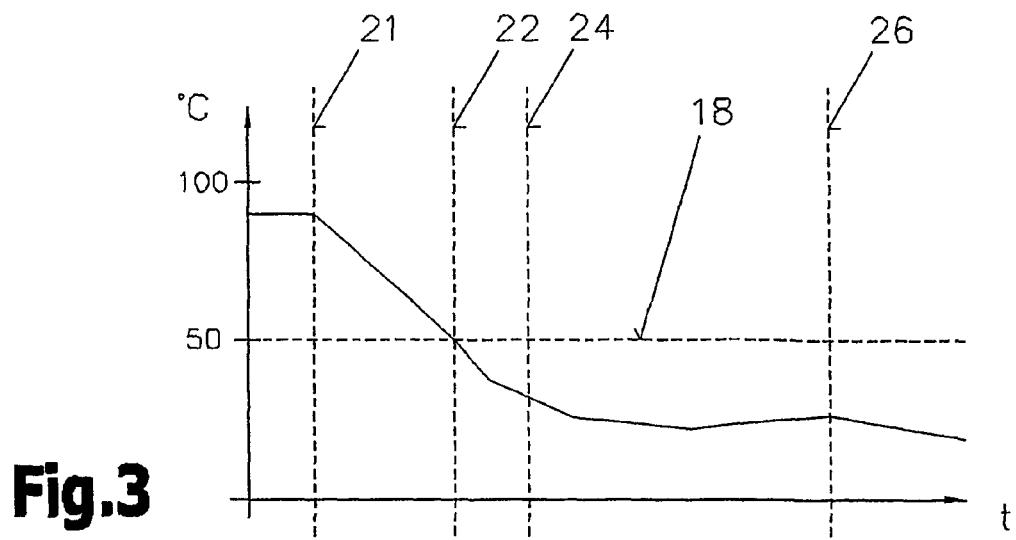
FIG. 3 shows the time course of the temperature of an engine of a vehicle after it has been turned off.

Yet, the point of time at which the burner 7 will be put into operation and activated primarily depends on the temperature of the engine and/or the engine block 12. This temperature should preferably be below a threshold value 18, e.g. 50° C. at the most, so that the temperature difference 27 necessary for the thermal element 8 will be given to allow for the latter to be operated at an optimum degree of efficiency. Accordingly, a monitoring unit 19 is connected to the control device 6 which evaluates and monitors the temperature of the engine block 12. The temperature is preferably measured by a sensor 20 which delivers a corresponding value to the monitoring unit 19 for evaluation. To this end, the sensor 20 is preferably arranged on the engine block 12 and in direct vicinity of the connection site of the "cold side" of the thermal element 8 on the engine block 12, respectively. Here, the apparatus 1 and its housing are preferably designed such that the sensor 20 abuts on the engine block 12 automatically after mounting of the apparatus 1 on the engine block 12, and can measure the temperature of the heat dissipating element 9, i.e. of the engine block 12, appropriately. This allows for the monitoring unit 19 to send a corresponding signal to the control device 6 via the data bus 30 when the temperature of the engine block 12 has fallen below the threshold value 18. This is particularly the case when the engine block 12 of the vehicle 5 has cooled down after turn off. For example, the vehicle 5 is turned off at point of time 21, and the temperature of the engine block 12 reaches the threshold value 18 at point of time 22, as illustrated in FIG. 3. From point of time 22, the burner 7 will be ignited, and the energy storage 2 will be charged, with the current delivered by the current generating device 3 to the charging device 4. Since a so-called "intelligent charging device" 4 is preferably used, all charging processes adapted to the type of the energy storage 2 can be employed and adapted to the condition of the energy storage 2.

Figure 4:
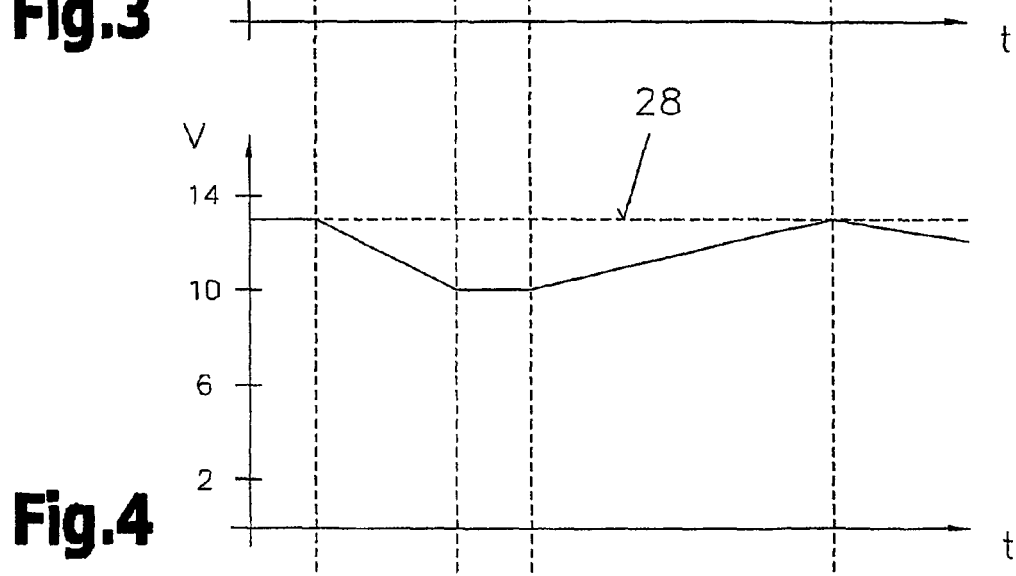
FIG. 4 shows the time course of the voltage of an energy storage of the vehicle after the engine has been turned off.
Figure 5:
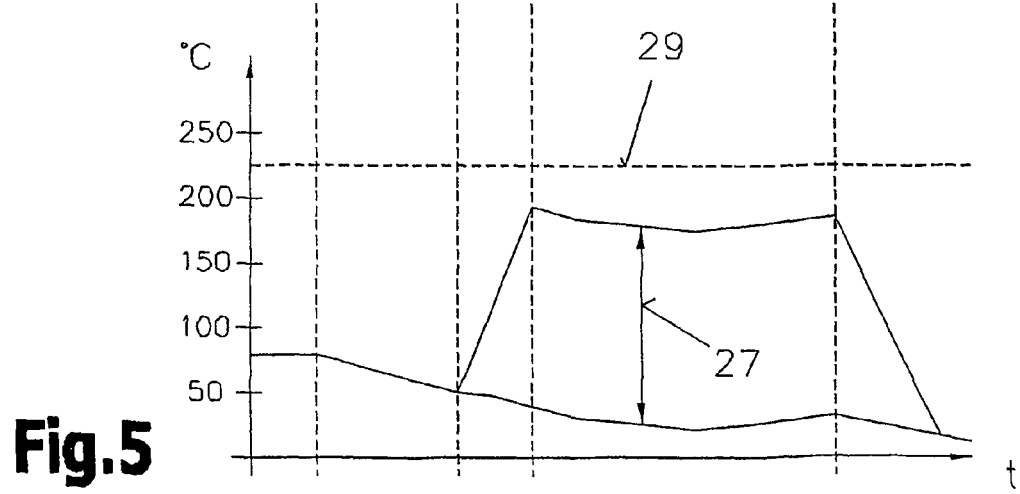
FIG. 5 shows the time course of the temperature on either side of a thermal element.

The charging condition of the energy storage 2 can, for example, also be assessed and monitored by measuring the electrical variables of the energy storage 2, e.g. voltage, internal resistance, current consumption, etc. This can be done directly by the charging device 4 or by the monitoring unit 19, which forward the corresponding values to the control device 6 via the data bus 30. For example, the monitoring unit 19 fulfills this function and is consequently provided with a voltage measuring device 23. The voltage measuring device 23 is correspondingly connected to the energy storage 2 so as to allow for measurement and for the monitoring unit 19 to monitor the voltage. As illustrated in FIG. 4, the voltage of the energy storage 2 will drop from its maximum value 28 as a function of its condition, age, etc., as soon as the vehicle 5 is turned off at point of time 21, and the energy storage 2 is no longer charged by a generator/electric generator of the vehicle 5. The reason for this voltage drop is the self-discharge of the energy storage 2, on the one hand, and the consumers, such as alarm systems, radio central locking systems, etc., as well as the inventive apparatus 1, on the other hand. Thus, the control device 6 permanently knows the charging condition of the energy storage 2, thereby allowing for the suitable charging process to be selected, in particular from the control device 6 or the charging device 4, upon activation of the burner 7 and/or the apparatus 1. In the simplest case, threshold values are deposited (not illustrated) for the corresponding charging processes so that there will be a maintenance charge in case the first threshold value has been fallen below, there will be a so-called IU charging process in case the next threshold value has been fallen below, etc.

If the burner 7 is ignited because the threshold value 18 of the engine temperature has been fallen below at point of time 22, the fuel will be combusted in the burner 7 and correspondingly heated, e.g. to 200° C. For example, this temperature is reached at point of time 24, whereupon a temperature difference 27 of about 150° C. will adjust between the "hot side" and the "cold side", and the thermal element 8 will be operated at the optimum degree of efficiency. This means that from point of time 24, the thermal element 8 generates a voltage to be used by the charging device 4. Thus, the charging device 4 can be activated, causing current to flow from the thermal element 8 to the charging device 4, which current will be adapted appropriately by the charging device 4 for charging the energy storage 2. To maintain the optimum temperature difference 27 during charging, which depends on the type of the thermal element 8 used, the temperature of the engine block 12 and also the temperature of the burner 7 are advantageously continued to be measured. For example, this allows for reactions to changes in the temperature of the engine block 12 caused by solar radiation or the like. Such changes in the temperature are illustrated between points of time 24 and 26 in FIG. 5. This is to be attributed to the fact that the "cold side" of the thermal element 8 corresponds to the temperature of the engine block 12. The temperature of the burner 7 is preferably measured via a sensor 25 which sends the measured value to the monitoring unit 19, and which is mounted on the outside of the burner 7 and on the connection site with the "hot side" of the thermal element 8, respectively. The monitoring unit 19 evaluates the measured data appropriately and forwards them to the control device 6 so that the combustion in the burner 7 will be controlled in a manner to allow for the desired temperature difference 27 at the thermal element to be maintained. Yet, such a control is effected within certain limits only since the "hot side" of the thermal element 8 must not exceed a certain maximum value 29. The range in which the optimum degree of efficiency of the thermal element 8 will be reached is only very narrow. This is why it is of particular importance for the heat dissipating element 9, i.e. the engine block 12, to be capable of absorbing much heat for a long period of time so that the temperature on the "cold side" will remain as constant as possible, and that there will be no need for readjusting the temperature of the burner 7, i.e. the "hot side" of the thermal element 8.

Such an operation allows for the charging device 4 to be optionally permanently supplied with current by the current generating device 3 and/or the thermal element 8 so that the energy storage 2 can be charged. Consequently, the voltage of the energy storage 2 again starts rising from point of time 24. In case threshold values deposited for the different charging processes have been exceeded, the charging process can be adapted appropriately, thus ensuring that the energy storage 2 of the vehicle 5 will be charged in a gentle manner. In case the voltage of the energy storage 2 has reached the desired maximum value 28, as can be seen at point of time 26, the burner 7 will preferably again be deactivated. This causes a temperature drop on the "hot side" of the thermal element 8 to substantially the temperature of the "cold side", as is illustrated after point of time 26 in FIG. 5. Accordingly, fuel will be saved and the pollutants produced during combustion in the burner 7 will be reduced. It goes without saying that it is yet also possible for the burner 7 to remain active and for a maintenance charging to be done. In this case the burner 7 could then be deactivated after several hours, e.g. Furthermore, the burner 7 will preferably be deactivated in case the monitoring unit 19 detects that the temperature of the engine block 12 is exceeding the threshold value 18 or that the voltage of the energy storage 2 is skyrocketing to the maximum value 28 (not illustrated), e.g. 13.4 Volt with a 12 Volt energy storage 2. This is a sign that the engine of the vehicle 5 has been started, and that the function of the inventive apparatus 1 is consequently no longer necessary. The burner 7 will likewise be deactivated in case the temperature of the burner 7 itself has exceeded a corresponding threshold value, with the temperature of burner 7 corresponding to the temperature of the "hot side" of the thermal element 8. This allows for the maximum temperature of the thermal element 8 to be prevented from being exceeded, what would result in a destroyed thermal element 8.

If the voltage of the energy storage 2 again falls below a threshold value, the burner 7 will again be activated and the energy storage 2 will be charged as described above.

Furthermore, a threshold value for the voltage (not illustrated) of the energy storage 2 can optionally be taken into consideration for activating the apparatus 1 and subsequently for charging the energy storage 2. This means that the burner 7 will be ignited only in case the temperature has fallen below the threshold value 18, and the voltage of the energy storage 2 has correspondingly dropped below the threshold value. For example, the monitoring unit 19 monitors this threshold value. In case the voltage falls below the threshold value after a certain period of time, which depends on the condition of the energy storage 2, the apparatus 1 will be activated and the energy storage 2 will be charged with an appropriate charging process. If the threshold value 28 has been reached, the apparatus 1 will again be deactivated. Such activation of the apparatus 1 results, e.g., in a duty cycle of from about 30 min to 2 hours, depending on the condition and size of the energy storage 2, per day. This reduces the duty cycle of the apparatus 1 so that the burner 7 will not combust fuel if there is no need to. This also prolongs service life of the thermal element 8 as well as of the other components.

Optionally, also several thermal elements 8 can be connected in series and/or in parallel so as to be able to provide for a higher current and/or a higher voltage. This is in particular used for specific applications since a temperature increase on the "hot side" is required to achieve an optimum degree of efficiency.

As the description of the apparatus 1 and its function given just above shows, the inventive apparatus 1 is able to charge the energy storage 2 of the vehicle 5 in a completely independent manner, and to maintain the capacity, e.g., of up to 300 Ah of the energy storage 2 without having to establish a connection to an electronic circuit of the vehicle 5. In particular, this has to be attributed to the fact that the temperature of the engine and/or the engine block 12 is directly monitored by the apparatus 1. This allows for the apparatus 1 to activate the corresponding components, and to charge the energy storage 2. This advantageously leads to an apparatus 1 which is easy to retrofit in a device 5. To this end, the apparatus 1 which is comprised of the current generating device 3 and the charging device 4 only has to be attached to the engine block 12, and the provided connections of the apparatus 1 have to be connected to the supply line 13 and the energy storage 2. Only three lines (charging lines 16, 17, and the fuel supply line 10) have to be connected to the apparatus 1 so as to allow for the energy storage 2 to be charged. There is no need for a complicated and complex connection to an electronic circuit of the vehicle 5.

It goes without saying that also a variant of the apparatus 1 is yet possible in which a connection to an electronic circuit of the vehicle 5 is provided. Accordingly, there can be a data exchange between the circuit of a vehicle 5 and the control device 6. This can in particular be used for querying the fuel level of the tank, for querying which consumers, such as an alarm system, etc., have been activated, for querying if the engine is being started or has been started, and much more. The electronic circuit of the vehicle 5 can optionally also control the inventive apparatus 1.

In general, mention shall also be made that the inventive apparatus 1 for charging the energy storage 2 of the vehicle 5 does not depend on the fuel required. It is only necessary to adapt the type of the burner 7 to the behavior of the fuel. For example, a vaporizing burner is used for the fuels gasoline, ethanol or the like, and a porous burner is used for fuels such as propanol, kerosine, and the like. Yet, it shall be noted that the type of the burner 7 is not decisive for the mode of operation of the inventive apparatus 1. The inventive apparatus 1 can also be used with the most different vehicles 5, and also be retrofitted in an advantageous manner since the apparatus 1 is not larger than about twice the size of a commercially available pack of cigarettes. Accordingly, it should be possible to arrange the apparatus 1 directly on the engine block 12 of each vehicle 5. Among others, the term "vehicle 5" comprises vehicles for road traffic (car, truck, motor cycle), railway vehicles, air vehicles, water vehicles, space vehicles, cable railways, elevators, etc. The inventive apparatus 1 can in particular be used where a fuel driven engine of a vehicle 5 is combined with an energy storage 2 which in most cases is used for starting and temporary supply of the vehicle electrical system.

The invention claimed is:

1. A method for charging an energy storage (2) via a current generating device (3) and a charging device (4), wherein a burner (7) of the current generating device (3) is supplied with fuel from a tank (11), and wherein the burner (7) is heated in its activated state by combustion of the fuel, said combustion being controlled by a control device (6), and wherein the current is generated with a thermal element (8) by a temperature difference and used for charging the energy storage (2), one side of said thermal element (8) being connected to the current generating device (3), wherein the energy storage (2) is charged for maintaining the capacity of the energy storage (2) of a turned off, non used vehicle (5), wherein the temperature of a heat dissipating element (9) is monitored, which heat dissipating element (9) is connected to the second side of the thermal element (8), and to which the current generating device (3) is mounted, and wherein the burner (7) is controlled as a function of the measured temperature of the heat dissipating element (9).

2. The method according to claim 1, wherein the burner (7) will be activated in case the measured temperature of the heat dissipating element (9) has fallen short of a threshold value (18).

3. The method according to claim 1, wherein the charging condition of the energy storage (2), in particular the voltage of the energy storage (2), is monitored.

4. The method according to claim 3, wherein an appropriate charging process is selected for the energy storage (2) as a function of the charging condition of the latter.

5. The method according to claim 3, wherein the burner (7) will be activated, and the energy storage (2) will be charged, in case the charge of the energy storage (2) and/or its voltage has fallen below a threshold value.

6. The method according to claim 1, wherein upon activation of the burner (7), the latter is supplied with fuel from the tank (11) of the combustion engine equipped vehicle (5), and ignited, with the fuel being combusted.

7. The method according to claim 6, wherein the burner (7) is kept at a substantially constant temperature during combustion.

8. The method according to claim 7, wherein the temperature of the burner (7) is adapted to the thermal element (8).

9. The method according to claim 1, wherein the temperature of the burner (7) is monitored.

10. The method according to claim 9, wherein the burner (7) will be deactivated in case a threshold value of the temperature of the burner (7) or the thermal element (8) on that side connected to the burner (7) has been exceeded.

11. The method according to claim 3, wherein the burner (7) will be deactivated in case a threshold value of the charge and/or the voltage of the energy storage (2) has been exceeded.

12. The method according to claim 1, wherein data are exchanged between the control device (6) and an electronic circuit of the vehicle (5).

13. An apparatus (1) for charging an energy storage (2) via a current generating device (3), comprising at least one control device (6), a burner (7) connected to a tank (11) for fuel supply, a charging device (4) connected to the energy storage (2), and a thermal element (8) whose one side is connected to the current generating device (3), wherein the second side of the thermal element (8) is connected to a heat dissipating element (9) of a vehicle (5), and wherein a monitoring unit (19) is provided for the temperature of the heat dissipating element (9) and connected to the control device (6) so that the current generating device (3) will be controllable to charge the energy storage (2) as a function of the temperature of the heat dissipating element (9).

14. The apparatus (1) according to claim 13, wherein at least one sensor (20) is provided for detecting the temperature of the heat dissipating element (9) and connected to the monitoring unit (19).

15. The apparatus (1) according to claim 13, wherein the at least one sensor (20) is integrated in a housing of the apparatus (1) which is attached to the heat dissipating element (9).

16. The apparatus (1) according to claim 13, wherein at least one sensor (25) is provided for detecting the temperature of the burner (7) and connected to the monitoring unit (19).

17. The apparatus (1) according to claim 13, wherein the heat dissipating element (9) is comprised of an engine block (12) or a frame part of the vehicle (5).

18. The apparatus (1) according to claim 13, wherein a device (23) for detecting the charging condition of the energy storage (2), in particular for detecting the voltage of the energy storage (2), is provided and connected to the monitoring unit (19).

19. The apparatus (1) according to claim 13, wherein the monitoring unit (19) is integrated in the control device (6).

20. The apparatus (1) according to claim 13, wherein the control device (6) is connectable to an electronic circuit of the vehicle (5), in particular via a data bus (30).

\* \* \* \* \*